United States Patent [19]
Riedel et al.

[11] Patent Number: 5,948,706
[45] Date of Patent: Sep. 7, 1999

[54] FIBRE COMPOSITE MATERIAL AND METHOD OF MANUFACTURE

[75] Inventors: Ulrich Riedel, Braunschweig; Michael Chowanietz, Abbenrode, both of Germany

[73] Assignee: Deutsches Zentrum fur Luft-und Raumfahrt e.V., Germany

[21] Appl. No.: 08/974,127

[22] Filed: Nov. 19, 1997

[30] Foreign Application Priority Data

Nov. 19, 1996 [DE] Germany .................... 196 47 671

[51] Int. Cl.$^6$ ................ B32B 5/16; C08L 93/02
[52] U.S. Cl. ............................. 442/59; 530/201
[58] Field of Search ............... 530/201; 442/59, 442/147, 161

[56] References Cited

U.S. PATENT DOCUMENTS

| | | | |
|---|---|---|---|
| 1,953,951 | 4/1934 | Boughton | 530/201 X |
| 2,010,226 | 8/1935 | Gardner | 530/201 |
| 3,625,933 | 12/1971 | Coyle | 530/201 |
| 5,542,331 | 8/1996 | Hartmann et al. | |
| 5,756,194 | 5/1998 | Shogren et al. | 428/312.4 |

FOREIGN PATENT DOCUMENTS

| | | |
|---|---|---|
| 0 687 711 A2 | 12/1995 | European Pat. Off. . |
| 195 41 757 A1 | 5/1997 | Germany . |

*Primary Examiner*—Daniel Zirker
*Attorney, Agent, or Firm*—Salter & Michaelson

[57] ABSTRACT

The invention relates to a fiber composite with a fibrous material for reinforcement and a matrix material consisting essentially of shellac. The invention also relates to a process for producing a fiber composite with the steps:

- dissolving the shellac in a solvent,
- impregnating the fibrous material,
- heating the impregnated fibrous material and
- compressing the impregnated fibrous material and simultaneously curing the matrix material.

The production process is alternatively characterized by the steps:

- dissolving the shellac in a solvent,
- obtaining a solid by removing the solvent,
- pulverizing the solid,
- working the pulverized solid into the fibrous material,
- heating the fibrous material mixed with the pulverized solid, in the process of which the solid softens and permeates the fibrous material, and
- compressing the permeated fibrous material and simultaneously curing the matrix material.

The fiber composite according to the invention is distinguished by the fact that it can be handled well for processing purposes and has good mechanical properties.

14 Claims, No Drawings

FIBRE COMPOSITE MATERIAL AND METHOD OF MANUFACTURE

The invention relates to a fibre composite with a fibrous material for reinforcement and a matrix material and to a process for the production thereof.

Fibre composites consist at least of the two components fibres and matrix, with the fibres serving to reinforce the composite material. In this case the fibres in particular absorb tensile forces acting on the material. The matrix fills cavities between the fibres and envelops these. The matrix thus transmits shear forces in particular. The matrix also protects the enveloped fibres against external influences. The so-called conventional fibre composites are known as, for example, carbon fibre-reinforced or glass fibre-reinforced plastics. However these proven materials, which have a high load-bearing capacity, entail the disadvantage of being difficult to recycle at the end of their period of use.

The formation of new lightweight building products of fibre reinforced-plastics increasingly gives rise to the question of their environmental compatibility or sensible disposal policies. Following the initial euphoria over the complete recycling of all plastics, the material recycling policy is frequently felt to be too expensive, inter alia because of its high processing costs, and new possibilities are being sought, such as raw material recycling or biological degradation, as environmentally compatible alternatives. The development of a biological, degradable construction material based on regenerative raw materials consisting of natural fibres, embedded in so-called biopolymers, is described in EP 0 687 711 A2. The latter proposes producing a fibre composite from biologically degradable fibrous and matrix material for moulded parts for the interior fittings of motor vehicles, for example. Such fibre composite components, which have a relatively short life, can be disposed of by composting in an ecologically harmless manner. This new construction material, which is called a "biocomposite", consists of so-called biopolymers which are reinforced with straightened or non-straightened natural fibres so as to adapt to the stress. The term biopolymers is understood to mean biologically degradable plastics which are produced from regenerative or fossil raw materials and can be disposed of by composting. The natural, organic macromolecules are obtained, for example, not just from sugar beet, potatoes, maize or cellulose, but also from waste paper.

The drawback lies in the fact that the biologically degradable plastics often have inadequate properties and are difficult to process. Although it is possible to produce biocomposites from the known biopolymers, it is impossible to obtain optimum composite strengths due to problems relating to processing or specific to the material. A problem relating to processing, for example, lies in the fact that the matrix material is highly viscous at the processing temperature. On the other hand, biologically degradable matrix systems with adequate processing properties have poor mechanical properties such as, for example, high breaking elongation.

The matrix systems which are available on the market are optimised with respect to their application, e.g. packing, and do not therefore have the desired properties for the intended field of employment in fibre composite technology. Either they can be handled well from the processing aspect and have poor mechanical properties (e.g. high breaking elongation) or they have good mechanical properties and give rise to considerable processing problems (e.g. high viscosity at the processing temperature). Both criteria are critical for the composite properties. An excessively high breaking elongation prevents optimum utilisation of the fibre strength, while an excessively high processing viscosity means poor impregnation, so that the composite exhibits inhomogeneities which in turn have a negative effect on the special mechanical features of a composite.

The object of the invention is therefore to provide a fibre composite with a fibrous material for reinforcement and a matrix material whose matrix system is composed of a natural material, can be handled well for processing purposes and has good mechanical properties.

This object is solved with respect to an above-mentioned fibre composite in that the matrix material consists essentially of shellac. Several production processes may be considered as alternatives. A particularly preferred production process is characterised by the steps of dissolving the shellac in a solvent, impregnating the fibrous material, heating the impregnated fibrous material, compressing the impregnated fibrous material and simultaneously curing the matrix material.

As a result of using a matrix material developed on the basis of shellac in fibre composites, the composite can be processed easily and satisfactorily while enabling good mechanical, physical, thermomechanical and chemical properties to be achieved. The dissolved shellac is sufficiently fluid at the processing temperature to achieve good permeation of the fibrous material which is to be enclosed. Shellac is dissolved in a solvent in order to produce the fibre composite according to the invention. It is thus possible either to directly impregnate the fibres which are to be embedded or alternatively to produce a powder which is introduced into the fibrous material and then compacted to form the desired composite by heating and compressing. A predetermined shape can be produced during the compression.

The use of shellac produces a thermosetting matrix material. Here the matrix is cured through the heat which is supplied. Other matrix systems soften when heated, so that the fibrous material is impregnated; it is only through cooling that this matrix resolidifies. This operation can in principle be repeated as often as desired. On the other hand, although the shellac-based matrix system also softens during the first heating operation, it is cured in the heating phase or undergoes irreversible crosslinking.

It is particularly preferable to add a crosslinking agent to the shellac. A combination of shellac with a crosslinking agent is clearly more suitable as a matrix material for a composite than pure shellac.

If the matrix material comprises crosslinking agent, a higher degree of crosslinking of the matrix material is achieved while reducing the processing time. The homogeneity of the composite is increased. Oxalic acid, urea, aluminium chloride, ammonium zirconium carbonate and/or ammonium compounds, e.g. ammonium bicarbonate, are preferably used as crosslinking agents.

Urea $CH_4N_2O$ is particularly preferred. A composition of 90% to 95% shellac, 5% to 10% urea and less than 5% other constituents for the matrix material in particular exhibits good properties for the resulting fibre composite.

If the matrix material comprises plasticizer, the fibre composite may have a desired flexibility. It is particularly preferable to use citric acid esters, glycerin, oleic acid, sodium stearate, potassium stearate and/or calcium stearate as the plasticizer. The properties of the shellac may thus be adapted to the flexible properties of the fibrous material.

If the matrix material comprises flame retardant, the fibre composite may be used for fire-retardant components.

Ammonium salt, ammonium polyphosphate, magnesium salt, magnesium hydroxide, aluminium salt, aluminium hydroxide, boron salt or mixtures of these components are particularly suitable as flame retardants.

The fibrous material of the fibre composite which is used for reinforcement may be in the form of fleeces, woven fabrics, knitted fabrics or yarns. The fibrous material may thus be adapted to the desired mechanical properties. Tensile forces which differ according to direction may be absorbed, depending on the type of interweave of two-dimensionally bonded fibres. Elastic properties may also be controlled according to direction by the type of weave.

Natural fibres are preferably used for the fibrous material with the naturally occurring matrix material. Ramie, flax, sisal, jute or hemp are particularly suitable for this. As natural fibres are frequently hollow, they have a high light-weight construction potential with respect to flexural strength, resistance to lateral bending and buckling strength. By encasing the natural fibres with shellac, these fibres, which are in most cases highly susceptible to mechanical and chemical influences, are protected against external stresses.

Any desired crosslinking agents, plasticizers and/or flame retardants are added to the shellac dissolved in a solvent in the production processes initially mentioned. Uniform intermixing of the additives can be easily guaranteed in the dissolved shellac. Uniform distribution of the additives in the solid which is obtained is also guaranteed when drying up the solution according to the alternative production process. The additives are therefore also delivered to the fibrous material with the powder obtained from this.

Alcohols such as, e.g. ethanol or alkaline aqueous solutions such as ammonium bicarbonate solutions are suitable solvents for the shellac.

If a fibre composite component is to have an increased material thickness and/or a particularly high mechanical load-bearing capacity, the impregnated or permeated fibrous material is stacked in a plurality of layers, possibly in different directions to one another. This pack of layers is subsequently heated and pressed and produces a high-strength fibre composite which also permits a higher concentrated load to be applied to two-dimensional components.

In this case the impregnated fibrous material is preferably dried at an average temperature before being layered. The majority of the solvent used for the matrix material escapes in the process. The preferred drying temperature is between 40° C. and 100° C., in particular approximately 60° C.

The dried, impregnated fibrous material strips, so-called prepregs, are then stacked according to the desired structure and heated in a mould. The heating temperature should in this case be 60° C. to 200° C., in particular approximately 160° C., and a moulding pressure of approximately 60 bar or 6 MPa is to be applied only after this temperature is reached.

Other, variable production processes are possible. The following processes may be used, inter alia, in this respect: winding technique, resin injection (e.g. RTM, DP-RTM process), pultrusion, extrusion, processes for producing prepregs by means of an automatic impregnating plant, vacuum bag technique, hot-pressing or moulding technique, autoclave technique, BMC (bulk moulding compound), SMC (sheet moulding compound), hand lay-up.

The fibre composites according to the invention are suitable for producing compression-moulded structural components of the panelling type, such as, for example, for interior door panelling for motor vehicles, and/or of the bearing type, such as, for example, for seat shells of office chairs.

It is also possible to treat the surface of materials which are otherwise known by means of the invention, employing formulations which are also used to produce the pure fibre composite and are applied following the initial steps also used here in the form of a solution (e.g. painting, brushing, rolling on, etc.), after which the solvent is removed, or applied as a powder. The layer is then cured under the action of heat, possibly also with pressure being applied to improve bonding.

Two examples of the invention are described in the following.

Naturally occurring shellac is dissolved in ethanol in the first embodiment to produce a fibre composite. A 30% solution is preferably formulated. Five percent by mass of urea as crosslinking agent is added to this solution. After the solution has been adequately mixed, it is worked into a natural fibre fleece, for example a flax fibre fleece. Crosslinking of the shellac is improved by the urea which is added. The quantity of solution is calculated such that the impregnated flax fleece, the so-called prepreg, has the desired fibre volume content.

The flax fleece impregnated with the shellac solution is then carefully dried in a drying cabinet, preferably at 60° C., in the process of which the solvent (ethanol) escapes.

For subsequent processing individual layers are cut from the impregnated flax fleece and stacked in a mould according to the desired material thickness and the desired mechanical properties. The mould is then closed and introduced into a heatable press. The mould should preferably be heated to 160° C. Once the temperature is reached, a pressure of approximately 60 bar is produced in the laminate by means of the press. The temperature and the pressure are then maintained for 20 minutes, for example. The mould is subsequently cooled and the finished laminate removed as a moulded component.

A 27 percent ethanolic shellac solution is produced in the second embodiment. The quantity of solution for the reinforcement material (e.g. a washed, needle-punched flax fibre fleece) is determined in accordance with the desired fibre volume content, which should be between 20 and 70%, so as to produce high-strength, rigid structures. Here the density of the natural fibres is approximately 1.5 g/cm$^3$ and that of the matrix approximately 1.29 g/cm$^3$. The quantity of urea added to the solution is such that the solid comprises 94% shellac and 6% urea. The fleece is impregnated with the solution with the aid of a sheer iron or a calender (pair of rollers). The prepreg which is thus produced is then dried in an oven at 60° C. for 4 hours. Layers of dried material are superimposed until the component is of the desired wall thickness. The stack is placed in a pressing die which is heated to 160° C. The component is then compressed at 60 bar, corresponding to 6 MPa specific pressure, for 15 minutes. The component may be removed from the mould while the latter is still hot. Components produced according to this process have particularly good mechanical properties.

We claim:

1. A fibre composite including a fibrous material for reinforcement and a matrix material, the matrix material comprising:

a thermoset mixture of shellac.

2. The fibre composite according to claim 1, wherein the thermoset mixture of shellac includes a crosslinking agent.

3. The fibre composite according to claim 2, wherein the crosslinking agent is selected from the group consisting of oxalic acid, urea, aluminum chloride, ammonium zirconium carbonate and ammonium compounds.

4. The fibre composite according to claim 3, wherein the matrix material comprises 90% to 95% shellac and 5 to 10% urea and less than 5% other constituents.

5

5. The fibre composite according to claim 1, wherein the thermoset mixture of shellac includes a plasticizer.

6. The fibre composite according to claim 5, wherein the plasticizer is selected from the group consisting of citric acid esters, glycerin, oleic acid, sodium stearate, potassium stearate and calcium stearate.

7. The fibre composite according to claim 1, wherein the thermoset mixture of shellac includes a flame retardant.

8. The fibre composite according to claim 7, wherein the flame retardant is selected from the group consisting of ammonium salt, ammonium polyphosphate, magnesium salt, magnesium hydroxide, aluminum salt, aluminum hydroxide, boron salts or mixtures of these components.

9. The fibre composite according to claim 1, wherein the fibres are selected from the group consisting of fleeces, woven fabrics, knitted fabrics or yarns.

10. The fibre composite according to claim 1, wherein the fibres consist of natural fibres.

11. The fibre composite according to claim 10, wherein the natural fibers are selected from the group consisting of ramie, flax, sisal, jute and hemp.

12. Building elements, including a surface coating with the fibre composite according to claim 1.

13. A fibre composite material comprising:

a thermosetting shellac; and reinforcement fibres.

14. The fibre composite material according to claim 13, further comprising a crosslinking agent.

* * * * *